C. A. BENOIST.
SHOCK ABSORBER FOR AUTOMOBILE DRIVING SHAFTS.
APPLICATION FILED FEB. 5, 1907.
946,953.
Patented Jan. 18, 1910.
2 SHEETS—SHEET 1.
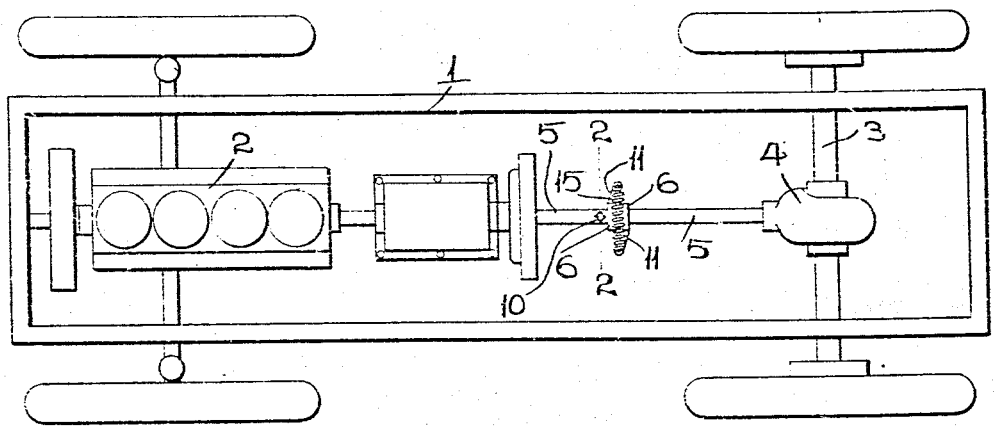
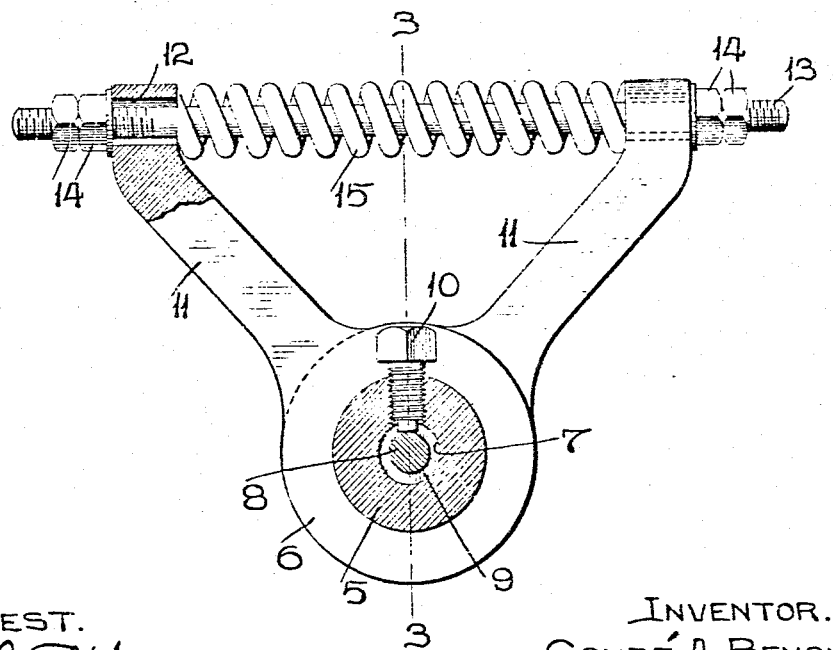
ATTEST.
H. J. Fletcher.
W. T. Smith.
INVENTOR.
CONDÉ A. BENOIST.
BY Higdon & Longan
ATT'YS.

C. A. BENOIST.
SHOCK ABSORBER FOR AUTOMOBILE DRIVING SHAFTS.
APPLICATION FILED FEB. 5, 1907.
946,953.
Patented Jan. 18, 1910.
2 SHEETS—SHEET 2.
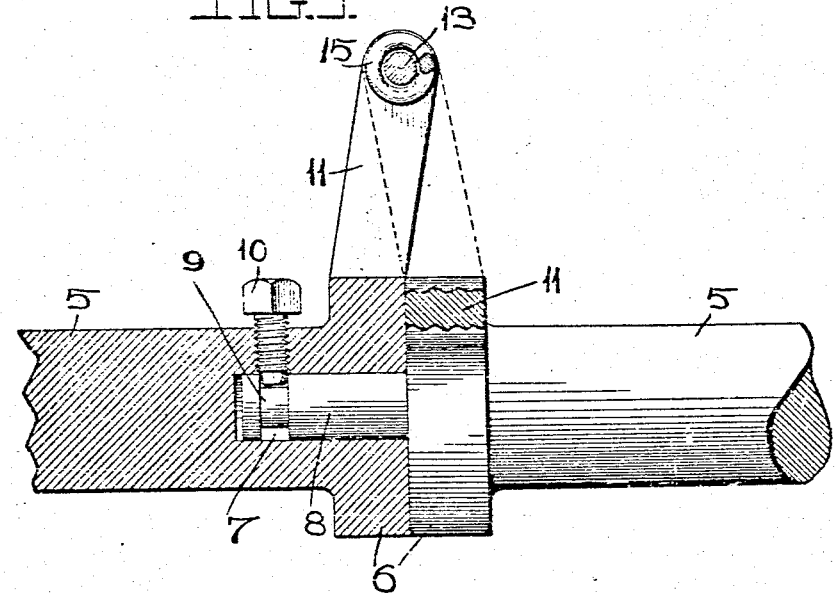
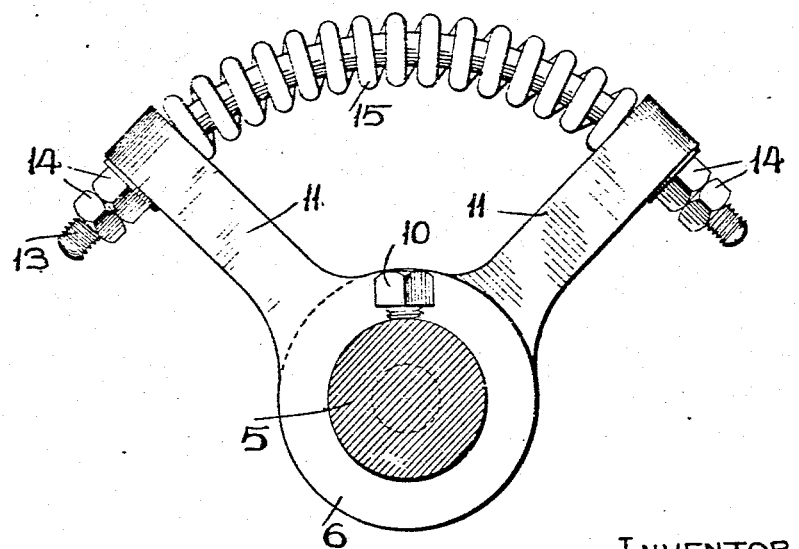
ATTEST.
H. J. Fletcher.
M. P. Smith.
INVENTOR.
CONDÉ A. BENOIST.
BY Higdon Longan
ATT'Y'S.

UNITED STATES PATENT OFFICE.

CONDÉ A. BENOIST, OF ST. LOUIS, MISSOURI.

SHOCK-ABSORBER FOR AUTOMOBILE DRIVING-SHAFTS.

946,953.  Specification of Letters Patent.  Patented Jan. 18, 1910.

Application filed February 5, 1907. Serial No. 355,933.

*To all whom it may concern:*

Be it known that I, CONDÉ A. BENOIST, a citizen of the United States, and resident of St. Louis, Missouri, have invented certain new and useful Improvements in Shock-Absorbers for Automobile Driving-Shafts, of which the following is a specification containing a full, clear, and exact description, reference being had to the accompanying drawings, forming a part hereof.

My invention relates to a shock absorber for automobile driving shafts, and the object of my invention is to arrange a joint in the driving shaft of an automobile between the engine and the driving gear, and to yieldingly connect the ends of the shaft at the joint in such a manner as that any shock upon the rear axle due to the wheels running into a rut, or striking an obstruction, will be absorbed at the joint, thus relieving undue and sudden strain upon the connections between the driving shaft and the rear axle, and also upon all parts connected to or supported by the driving shaft.

My invention consists of a shaft formed in two parts, the meeting ends of which are provided with projecting arms, and a stiff, expansive coil spring arranged between the outer ends of said arms.

My invention further consists in certain novel features of construction and arrangement of parts, which will be hereinafter more fully set forth, pointed out in the claim, and illustrated in the accompanying drawings, in which:—

Figure 1 is a plan view of the frame of an automobile, showing the engine, the driving shaft, and my improved shock absorber, arranged in said shaft; Fig. 2 is an enlarged cross section taken on the line 2—2 of Fig. 1; Fig. 3 is a vertical section taken on the line 3—3 of Fig. 2; Fig. 4 is a detail section similar to Fig. 2, and showing a modified arrangement of the spring made use of in the device.

Referring by numerals to the accompanying drawings:—1 designates the frame of an automobile, 2 the engine, 3 the rear axle, and 4 the gear casing, which incloses the driving gear between the driving shaft and said rear axle.

The shock absorber, as contemplated by my invention, provides for the formation of the driving shaft 5 in two parts, and the meeting ends of the two parts of the shaft are provided with flanges 6; and formed in the center of one of the ends is an aperture 7, which receives a correspondingly located pin 8 formed integral with the adjacent end of the shaft, in which pin is formed a groove 9; and passing through that portion of the shaft which is provided with the aperture 7 is a pin or bolt 10, the end of which enters the groove 9. Formed integral with each flange 6 is an outwardly projecting arm 11, and the pair of arms are preferably arranged at an angle of 90° relative one another. Formed through the outer ends of said arms are slots 12, and passing therethrough is a rod 13, on the screw threaded ends of which, outside the ends of the arms 11, are located nuts 14; and mounted upon said rod and interposed between the ends of the arms 11 is a stiff compression spring 15. In some instances, I prefer to bend the rod 13 so the same is concentric with the center of the driving shaft, (as shown in Fig. 4.)

The shaft 5 is driven in the usual manner by the engine, and when the usual clutch or corresponding device is thrown in to connect the engine shaft with the driving shaft, the rear axle will be driven in the usual manner; and, during this operation, and while the rear wheels are traveling on a smooth road bed, the spring between the arms 11 will be compressed to a very slight degree owing to its great resiliency; but should the rear wheels drop into a depression, such as a rut, or hole, or should said rear wheels pass over an obstruction, the consequent resistance and shock resulting therefrom is absorbed or relieved, as the arms 11 will move toward one another, thus compressing the spring 15.

The parts of the joint in the driving shaft revolve whenever the machine is in operation, and the spring 15 is of sufficient strength to withstand the ordinary torsion of the driving shaft, but said spring compresses according to the severity of the shock upon the rear wheels, and this action relieves undue strain upon the gearing and the casing 4, and reduces to a minimum the danger of stripping of teeth from said gearing, which action renders the machine inoperative.

A device of my improved construction is simple, inexpensive, easily applied to all forms of driving shafts, and can be advantageously used on the driving shafts of various machines other than automobiles.

I claim:—

The combination with a driving shaft, constructed in two parts, of flanges integral with the meeting ends of the two parts of the shaft, an arm formed integral with each flange, the outer ends of which are in alinement with one another, a rod loosely fitting in the apertures formed in the outer ends of said arms, the ends of which rod are screw threaded, nuts located on the screw threaded ends of the rods, a compression spring arranged on the rod between the ends of the arms, and of such dimensions to prevent the ends of the arms abutting; a centrally arranged pin integral with and projecting from the end of one of the shafts and engaging in a corresponding recess formed in the opposite portion of the shaft, there being a groove formed in said pin, and a set screw passing through that part of the shaft provided with the recess, the inner end of which screw engages in the groove in the pin.

In testimony whereof, I have signed my name to this specification, in presence of two subscribing witnesses.

CONDÉ A. BENOIST.

Witnesses:
 M. P. SMITH,
 EDWARD E. LONGAN.